United States Patent [19]

Wisner et al.

[11] 4,213,082

[45] Jul. 15, 1980

[54] VOLTAGE REGULATOR

[75] Inventors: Daniel A. Wisner, Milan; Truman T. Schmalzriedt, Farmington Hills, both of Mich.

[73] Assignee: Burroughs Corporation, Detroit, Mich.

[21] Appl. No.: 955,253

[22] Filed: Oct. 27, 1978

[51] Int. Cl.² ............................................. G05F 1/56
[52] U.S. Cl. .............................. 323/17; 323/DIG. 1; 307/300; 361/18
[58] Field of Search ........................... 323/17, DIG. 1; 307/317 A, 300; 363/24–26; 361/18, 111

[56] References Cited

U.S. PATENT DOCUMENTS

| | | | |
|---|---|---|---|
| 3,571,624 | 3/1971 | Leung | 307/300 X |
| 3,610,963 | 10/1971 | Higgins | 323/22 T X |
| 3,924,223 | 12/1975 | Whyte et al. | 361/111 X |
| 3,983,418 | 9/1976 | Wallace | 307/300 X |
| 4,021,759 | 5/1977 | Campi | 361/119 X |
| 4,110,775 | 8/1978 | Festa | 307/317 A X |

*Primary Examiner*—J. D. Miller
*Assistant Examiner*—Peter S. Wong
*Attorney, Agent, or Firm*—Delbert P. Warner; William M. Hanlon, Jr.; Charles E. Quarton

[57] ABSTRACT

A voltage regulator for converting an unregulated input voltage into a regulated D.C. voltage. The voltage regulator includes a driver transformer which periodically receives energizing current from a voltage source through a transistor switch. A switching regulator controller regulates the conduction time of the transistor so as to control the amount of energizing current supplied to the driver transformer. The driver transformer secondary windings drive the base of output transistors which, when conducting, connect the primary windings of an output transformer to the voltage supply. A capacitor is connected in parallel with the primary winding of the driver transformer so as to short circuit the primary winding of the drive transformer when the driver transistor is turned off. The current flow in the secondary of the driver transistor causes removal of the stored base charge from the output transistors which decreases the turn off time of the output transistors. The primary windings of the output transformer are connected in series with first and second capacitors connected between the common junction of the primary windings and the voltage supply to effectively create a virtual ground at the common junction. One end of each of the secondary windings of the output transformer is connected to Schottky diodes arranged in a full-wave, center tapped rectifier configuration. A hollow ferrite sleeve is disposed around a conductor connecting each Schottky diode with a secondary winding and provides sufficient inductance to protect the Schottky diodes from transient reverse overvoltages.

12 Claims, 5 Drawing Figures

VOLTAGE REGULATOR

CROSS-REFERENCE TO RELATED APPLICATIONS

Certain of the subject matter disclosed but not claimed herein is set forth and claimed in copending application, Ser. No. 955,241, filed Oct. 27, 1979, assignee Docket No. 21-1327, in the name of F. Haas and assigned to the assignee of the present application.

BACKGROUND OF THE INVENTION

1. Field of the Invention

This invention relates, in general, to voltage regulators and, more specifically, to D.C. voltage regulators.

2. Description of the Prior Art

Electronic apparatus, such as computers, digital logic systems and similar applications, require highly reliable power supplies having precisely regulated output voltages. In order to regulate, or maintain the output voltage at a constant magnitude, voltage regulators are commonly utilized which could include a switching device, such as a transistor, for periodically transferring energy from a power source to a storage means, such as an inductor. When the transistor is turned off, i.e., made non-conductive, the current which has built up in the inductor is transferred to the load or utilization device.

In a prior art regulator, known as a switching regulator, the transistor is opened cyclically and at a constant frequency, with the time intervals between openings being apportioned in response to the magnitude of the output voltage of the regulator. More specifically, if the output voltage drops below a desired level, the switching device is connected to the inductor for a greater proportion of a given cycle so that the inductor current builds up to a higher value than when the build-up time is less. The higher current stored in the inductor causes the output voltage of the regulator to be raised to the desired level.

However, such prior art regulators have distinct disadvantages. The first of these is the low efficiency of the regulators due to the need for circuits to remove the stored base charge from the output transistors which, in so doing, require power from the regulator circuit. Secondly, the number and size of the components required to construct a reliable switching regulator has restricted the use of such devices to bulk power supplies for electronic apparatus. In such applications, it is a common practice to have a bulk D.C. power supply at a location remote from the power utilization devices which, in electronic art, are typically printed circuit boards mounted in a rack. The bulk power is then carried by a conducting cable and a series fuse from the bulk supply to the individual circuit boards. Since there exists a voltage drop across both the fuse and the cable, the power supplied to the printed circuit boards is a small percentage below the desired magnitude, which lowers the efficiency and reliable operation of the electronic components connected thereto.

Thus, it would be desirable to provide a voltage regulator for providing a precisely regulated D.C. voltage at its output that is more efficient than prior art regulators. It would be also desirable to provide a voltage regulator that provides better regulation of the magnitude of the output voltage than prior art regulators. It is also desirable to provide a voltage regulator that is constructed of fewer parts than similar devices. Finally, it would be desirable to provide a voltage regulator that can be placed on a printed circuit board and disposed in a rack adjacent to the power utilization electronic printed circuit boards.

SUMMARY OF THE INVENTION

There is disclosed herein a new and improved voltage regulator that provides a precisely regulated D.C. voltage at its output. The voltage regulator is designed to deliver energy from a power source to a load and includes a driver transformer means and a driver transistor switch means for connecting the driver transformer means to the power source so as to supply energizing current thereto. A switching regulator controller controls the switching means between conductive and non-conductive states and includes means for varying the conducting time of the switching means so as to vary the amount of energy supplied to the driver transformer. Output switch means, such as transistors, are connected in pairs between the secondary windings of the driver transformer and the primary windings of an output transformer. The secondary windings of the output transformer are connected to power diodes disposed in a full-wave, center-tap rectifier configuration and a filter in order to provide a regulated D.C. output voltage.

In operation, the switching regulator controller gates the driver transistors into conduction which supplies energizing current to the primary windings of the driver transformer. The current flowing in the primary of the driver transformer induces a current in the secondary windings which gates the output transistors into conduction, thereby allowing energizing current to flow to the primary windings of the output transformer which induces a current in the secondary output windings. The output of the output transformer is passed through two full-wave, center-tapped diode rectifier circuits connected in parallel and a filter to remove ripple and thereby provide a precisely regulated D.C. output voltage. The voltage regulator further includes overcurrent sensing means which compares the output of the regulator with a precise reference signal and provides an error signal when the current drawn by a load exceeds a predetermined value. The error signal is fed back to the switching regulator controller which, in turn, linearly decreases the output voltage of the voltage regulator through the driver and output circuits until the overcurrent condition is removed.

In one aspect of this invention, a capacitor is connected in parallel across the primary winding of each driver transformer in order to provide means for reducing the stored base charge on the output transistors which decreases the turnoff time of the output transistors and thereby provides improved efficiency. Similar prior art circuits utilize additional components and, in certain instances, connect a series resistor-capacitor circuit in parallel with the primary winding of the driver transformer for damping. Not only does the use of a capacitor without a series resistor more effectively reduce the stored base charge of the output transistors when the reversal of the polarity of the primary and secondary windings of the driver transformer occurs but, also, it requires less components and is more efficient than the prior art schemes. In addition, the novel driver transformer circuit of this invention utilizes the energy previously stored in the driver transformer magnetic current to reverse bias the output transistors and to quickly remove the stored base charge thereon. Previously, many additional power consuming components were used in an effort to remove this energy from the driver transformer instead of utilizing it to help remove the stored base charge from the output transistors.

According to another aspect of this invention, capacitors are connected between the power supply and the center connection between the primary windings of the output transformer to create a virtual ground at the center connection. Not only does such an arrangement reduce capacitor heating prevalent in the prior art circuits utilizing a single capacitor in series with a single primary output winding but, also, it causes cancellation of input current transients due to current summing at the virtual ground between the capacitors. Input current transients are typically very prevalent in those prior art circuit arrangements requiring some form of input voltage filtering.

In another aspect of the present invention, protection from transient reverse overvoltages for the Schottky diodes connected to the secondary windings of the output transformer is provided by hollow sleeves of magnetic material, such as ferrite, which are disposed in inductive relation around the conductor connecting the diode with the secondary winding. The small inductance provided by the hollow sleeve is sufficient to maintain the rate of change of the reverse voltage appearing across the diode below maximum ratings, and, further, provides this protection with fewer components than the series resistor-capacitor networks normally connected in shunt with Schottky diodes.

Finally, this invention utilizes a novel overcurrent sensing technique wherein comparators compare the output of the voltage regulator with a precise reference signal and provide an error signal indicative of overcurrent conditions. The overcurrent error signal is tied to the output of a transconductance amplifier in the switching regulator controller and clamps down the output voltage of the controller towards ground. The output of the switching regulator controller is uniquely fed back to the input of the transconductance amplifier by a resistor connected in negative feedback relation so as to linearly reduce the output voltage of the controller and of the voltage regulator until the overcurrent condition is eliminated.

The use of the unique overcurrent sensing technique described above with the minimum parts count provided by the other portions of the voltage regulator circuitry uniquely enables the voltage regulator to be placed on a printed circuit board. Furthermore, the improved circuitry of the output transformer significantly reduces noise prevalent in prior art regulators, thereby enabling the voltage regulator to be placed in the same logic rack as the power utilization devices which are commonly mounted on printed circuit boards. By providing overcurrent sensing in the voltage regulator, the use of bulk regulated power supplies which provide power to the utilization devices through conductors and series fuses are eliminated. By utilizing the teachings of this invention, a bulk unregulated power supply may be connected to the voltage regulator of this invention mounted on a printed circuit board located in a logic rack with the power utilization electronic printed circuit boards. In such a configuration, the voltage regulator of this invention provides better regulation of the output voltage than prior art regulators and, at the same time, more efficient utilization of electrical power.

BRIEF DESCRIPTION OF THE DRAWING

The various features, advantages and other uses of this invention will become more apparent by referring to the following detailed description and drawing, in which.

DESCRIPTION OF THE PREFERRED EMBODIMENT

Figure 1:
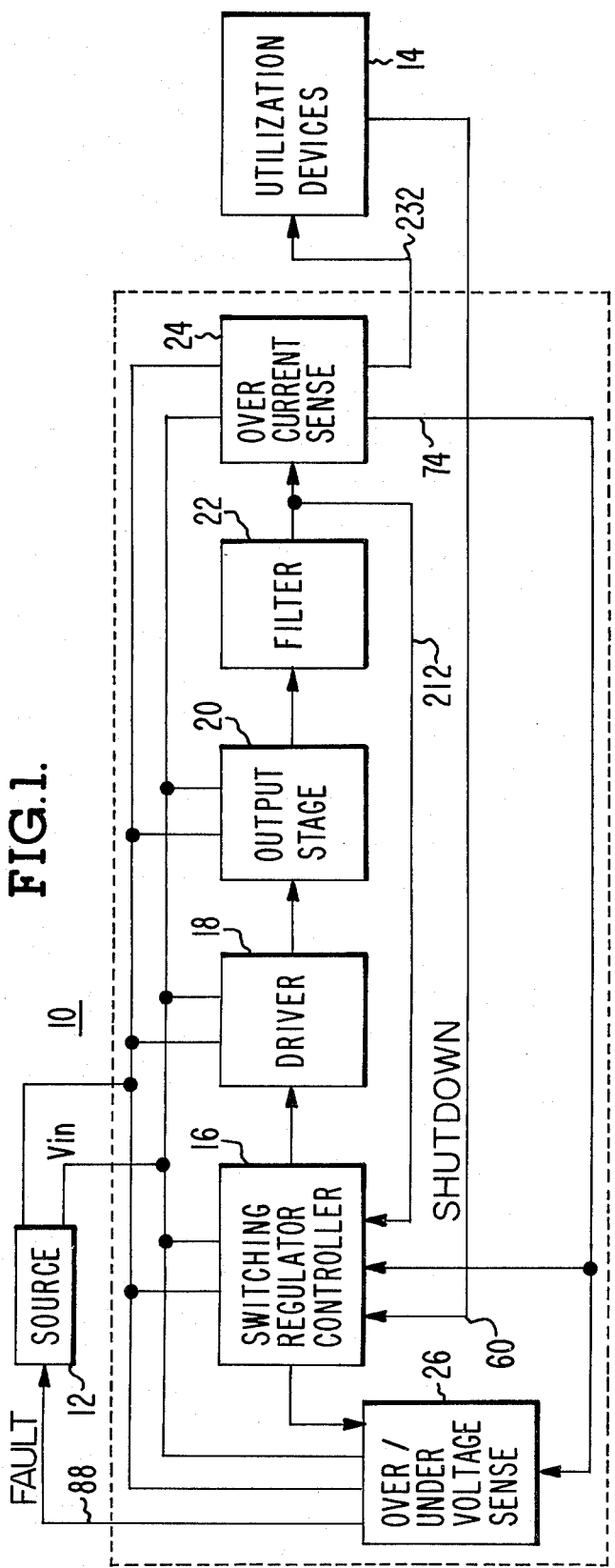
FIG. 1 is a block diagram of a voltage regulator constructed according to the teachings of this invention.

Throughout the following description, identical reference numbers are utilized to refer to the same component shown in all figures of the drawing.

Referring now to the drawing, and to FIG. 1 in particular, there is shown a voltage regulator 10 constructed according to the teachings of this invention. The voltage regulator 10 receives an unregulated voltage from a suitable source 12, such as a power supply, and converts it to a regulated D.C. output voltage for use by utilization devices 14, which typically are electronic circuits. Although the voltage regulator 10 is described as receiving a D.C. input voltage having a magnitude of ±24 volts and provides an output voltage of +5 volts, it will be understood that voltage regulators constructed according to the teachings of this invention may also receive A.C. or D.C. input volts of any suitable magnitude and, further, may provide different magnitudes of D.C. output voltage.

Voltage regulator 10 includes a switching regulator controller 16 which provides pulses to the driver stage 18 at a suitable frequency, such as 20 kHz., with the width of each pulse determining the amount of energy delivered to the driver stage 18. Switching regulator controller 16 is responsive to the magnitude of the output voltage and varies the pulse width of the pulses accordingly so as to maintain the magnitude of the output voltage at a constant level. The driver stage 18 includes an energy storage means, such as a transformer, which is periodically connected to the voltage source 12 by switch devices, such as transistors. The switch devices are switched between conductive and non-conductive state by the pulses from the switching regulator controller 16 and thereby determine the amount of energy transferred to the driver transformer.

The voltage regulator 10 further includes an output stage 20 consisting of output switch devices and an output transformer. The output switch devices are connected to the secondary windings of the driver transformer and, when driven to the conductive state, connect the output transformer to the voltage source 12 thereby allowing a predetermined amount of energy to be transferred to the output transformer. The output from the output transformer is passed through a suitable filter 22 which removes the ripple from the output signal in order to provide a D.C. output voltage of a desired magnitude. The output from the filter 22 is carried to an overcurrent sense circuit 24 which compares the output of the voltage regulator 10 with the precisely regulated reference signal and senses when an overcurrent condition exists. The overcurrent sense circuitry 24 provides a signal to the switching regulator controller 16 which, in turn, linearly reduces the output voltage of the voltage regulator 10 through the driver and output stages 18 and 20, respectively, until the overcurrent condition is removed. The voltage regulator 10 further includes over/under voltage sense circuitry 26 which compares the output of the voltage regulator 10 with a precise reference signal and provides a signal to the voltage source 12 indicating whenever the output of the voltage regulator 10 has not reached the desired magnitude.

Figure 2:
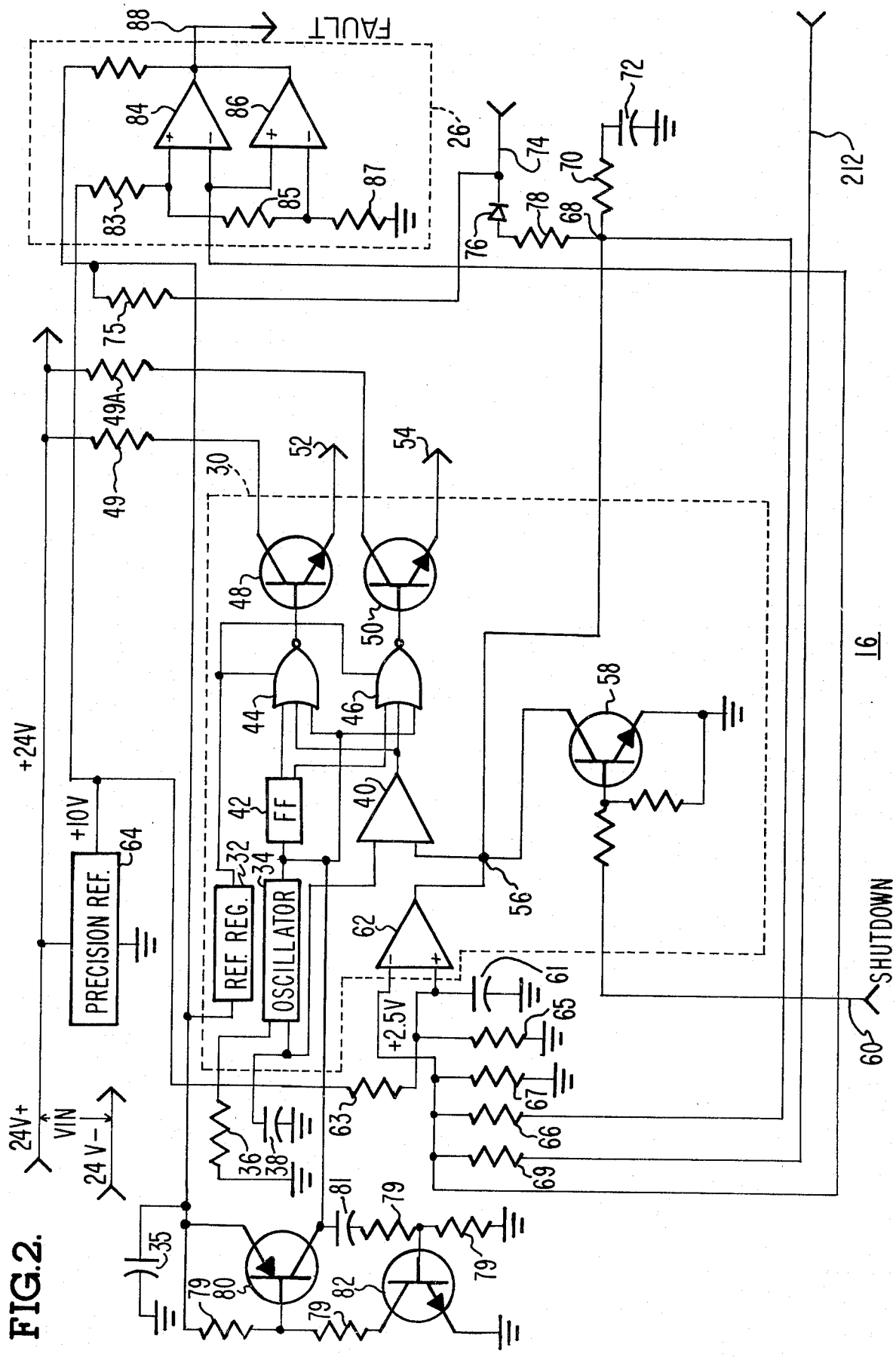
FIG. 2 is a detailed schematic diagram of the switching regulator control and over/under voltage sense circuit shown in FIG. 1.

Referring now to FIG. 2, there is shown a detailed schematic diagram of the switching regulator controller 16. The switching regulator controller 16 includes a pulse width modulator circuit 30 which may be constructed of individual components or may be a single integrated circuit chip, such as Model No. SG1524 marketed by Silicon General, Inc., Westminster, California. The pulse width modulator circuit 30 includes a reference regulator 32 which provides a +5 volt reference signal that is utilized to drive the other elements of the pulse width modulator 30. The pulse width modulator 30 includes an oscillator 34 which uses resistor 36 to establish a programmable current into a current mirror circuit which, in turn, charges capacitor 38, thereby providing a linear ramp voltage which is used as the time base signal by comparator 40. The output of oscillator 34 is an input to flip flop 42 whose output pulse width is fixed at 50% of the 20 kHz. frequency, due to the flip flop complementing and the division of the oscillator frequency by 2. The output of flip flop 42 is an input to NOR gates 44 and 46 and alternately triggers one of the NOR gates 44 or 46 on. The other inputs to the NOR gates 44 and 46 include the output of oscillator 34 and the output of the width modulation comparator 40. The outputs of NOR gates 44 and 46 are respectively connected to the base of transistors 48 and 50, respectively. The collectors of the transistors 48 and 50 are connected through suitable dropping resistors 49 and 49A to the +24 volt supply. Thus, when the input conditions to one of the NOR gates 44 or 46 is satisfied, the output of the NOR gate will supply base current through the respective one of transistors 48 and 50, thereby gating the transistor 48 or 50 on and allowing energizing current to flow from the +24 volt supply, through the transistor 48 or 50, to the driver stage 18 of the voltage regulator 10 by conductors 52 and 54 which are respectively connected to the emitters of the transistors 48 and 50. According to the teachings of this invention, the flip flop 42 alternately triggers NOR gates 44 and 46 on, thereby gating transistors 48 and 50 to the conductive state on alternating cycles of the 20 kHz. frequency output signal of the oscillator 34.

As described above, the capacitor 38 provides a ramp signal to one input of comparator 40. The other input of the comparator 40 is from junction 56 which is connected to the collector of a transistor 58 which, when triggered to the conductive state by a shut-down signal on conductor 60 from the utilization devices 14, connects the common junction 56 to ground and thereby deactivates the voltage regulator 10. The common junction 56 is also connected to the output of amplifier 62. The amplifier 62 is a differential input, transconductance amplifier having a relatively high output impedance, on the order of a few megaohms. The noninverting (+) input such as a few milleohms, of the amplifier 62 is connected to a +10 volt supply provided by a precision reference circuit 64 which essentially includes a zener diode and precision trimmed resistors to provide a precise reference voltage. According to the teachings of this invention, the +10 voltage is divided to 2.5 volts by two precision resistors 63 and 65. The inverting input (−) of the amplifier 62 is connected by resistor 69 and conductor 212 to the output of the filter stage 22. A compensation network, including series resistor 70 and capacitor 72, is connected to the output of the amplifier 62 of the pulse width modulator circuit 30 at junction 68 in order to control the frequency and phase response of the error amplifier 62. The output of the overcurrent sense circuit 24, described in detail hereafter, is connected via conductor 74 and a series diode 76 and resistor 78 circuit to the common junction 68 at the output of amplifier 62 of the pulse width modulator circuit 30, and provides a signal indicating the existence of an overcurrent condition which forces the output of amplifier 62 in the direction of ground.

In operation, variations in the magnitude of the output voltage of the regulator 10 will be reflected at the inverting (−) input of amplifier 62. The output of amplifier 62 will vary in accordance with the changed input conditions and, in turn, will change the input to comparator 40. As comparator 40 compares the output of amplifier 62 with the sawtooth waveform from capacitor 38, a change in the output of amplifier 62 will cause a corresponding change in the output of comparator 40 which will vary the length of time the magnitude of the output of comparator 40 is in the true or on input state to the NOR gates 44 and 46. Thus, the length of time transistor 48 or 50 is conducting will be changed in order to vary the amount of energy supplied to the driver stage, as described in detail hereafter, and thereby return the output voltage of the regulator 10 to the desired magnitude.

The switching regulator controller 16 also includes transistors 80 and 82 which are arranged in a single shot configuration so as to provide a minimum clock pulse width, typically 5 microseconds, which prevents transistors 48 and 50 of the pulse width modulator circuit 30 from being in the conductive state at the same time. In addition, the inverting (−) input of amplifier 62 is connected to the inputs of comparators 84 and 86 of the over/under voltage sense circuitry 26. The comparators 84 and 86 compare the output of the regulator 10 with a precise reference voltage from the precision reference 64 and thereby provide at their output 88 a signal which is an indication of over/under voltage. This signal 88, labelled FAULT, is fed to the voltage source 12 and indicates when the output of the regulator 10 is not up to the desired magnitude such that the voltage source 12 may deenergize the voltage regulator 10 and prevent damage to the utilization devices 14 connected thereto.

Figure 3:
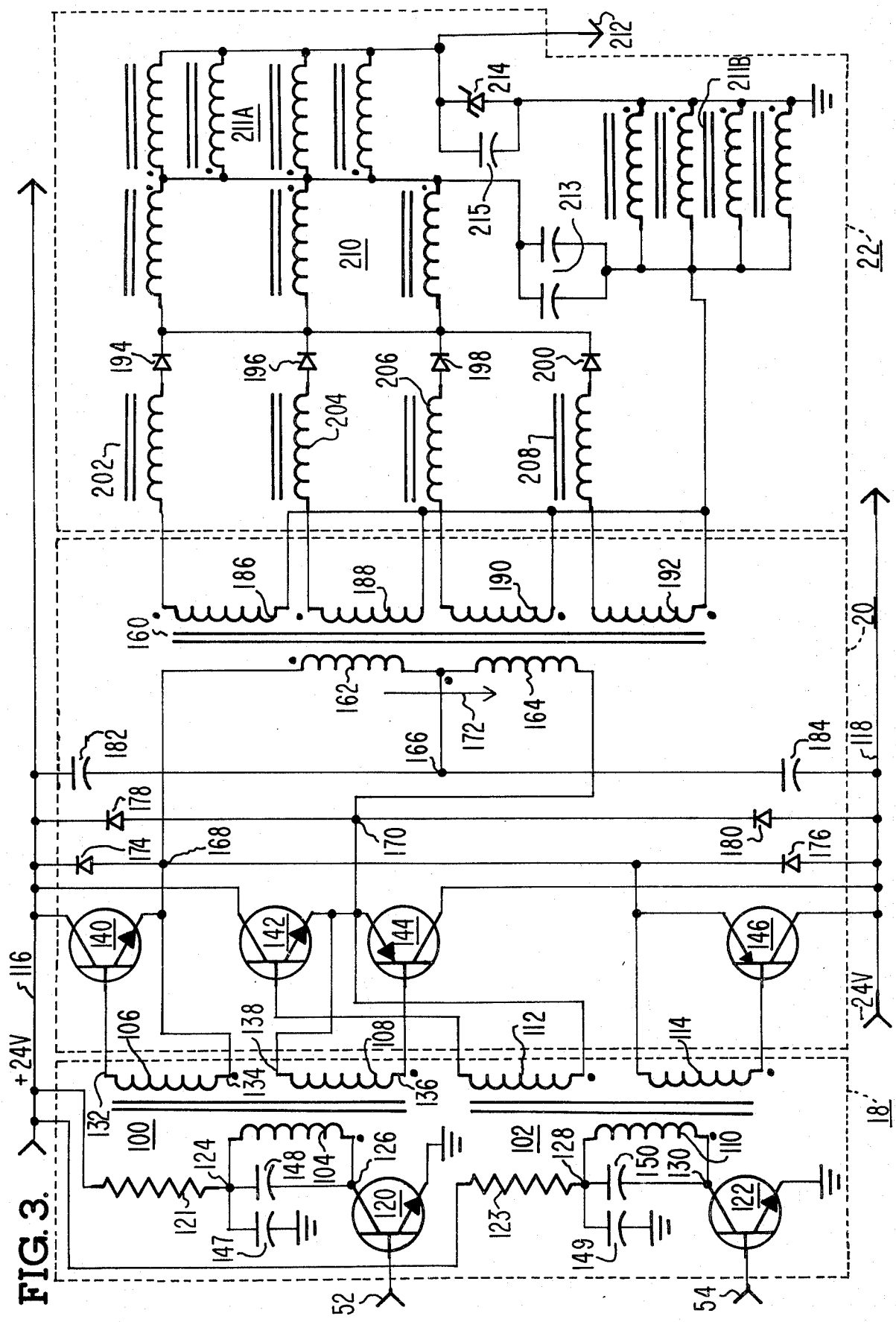
FIG. 3 is a detailed schematic diagram of the driver, output and filter circuits shown in FIG. 1.

Referring now to FIG. 3, there is shown a detailed schematic diagram of the driver stage 18, the output stage 20 and the filter stage 22 of the voltage regulator 10. The driver stage 18 includes first and second driver transformer means 100 and 102, respectively, each having a single primary and first and second secondary windings inductively coupled around a magnetic core, such as primary winding 104 and secondary windings 106 and 108 on driver transformer 100 and primary winding 110 and secondary windings 112 and 114 of the second driver transformer 102. The driver stage 18 further includes first and second switch means 120 and 122, respectively, which are typically transistors. The transistors 120 and 122 have their base terminals connected by conductors 52 and 54, respectively, to the emitters of transistors 48 and 50, respectively, in the pulse width modulation circuitry 30 of the switching regulator controller 16, shown in FIG. 2, and are switched between conductive and non-conductive states by the pulses generated by the pulse width modulation circuitry 30. As indicated previously, the transistors 48 and 50 are triggered into the conductive state on alternate cycles of oscillator 34 output. Although two separate driver circuits are illustrated, each including a driver transistor and a driver transformer, it will be understood that the teachings of this invention are equally applicable to voltage regulators having single driver stages comprising a single driver switch means and a single driver transformer.

As shown in FIG. 3, the first end of each primary winding of the driver transformers, such as first end 124 of primary winding 104 and first end 128 of primary winding 110 is connected through a resistor to the positive supply voltage conductor 116. The second end of each primary winding, such as second end 126 of primary winding 104 and second end 130 of primary winding 110 is connected to the collector of the associated driver transistor, such as driver transistors 120 and 122, respectively. The emitters of the driver transistors 120 and 122 are connected to ground such that when the transistors 120 and 122 are triggered to the conductive state by the pulse width modulation circuitry 30, shown in FIGS. 1 and 2, the primary windings 104 and 110 of the driver transformers 100 and 102, respectively, are connected between the supply voltage and ground, thereby causing an energizing current to flow through the respective primary windings. Each drive transformer 100 and 102 has associated therewith first and second secondary windings, such as secondary windings 106 and 108 of driver transformer 100 and secondary windings 112 and 114 of driver transformer 102. The secondary windings are each associated with an output switch means in the output stage 20 of the voltage regulator 10, as described hereafter.

The output stage 20 of the voltage regulator 10 includes output switch means 140, 142, 144 and 146, each associated with one of the secondary windings of the driver transformers 100 and 102. According to the preferred embodiment of this invention, the output switch means 140, 142, 144 and 146 are transistors with switch means 140 and 142 being NPN-type transistors and switch means 144 and 146 being PNP-type transistors. Since the connections between the output switch means 140 and 144 and the secondary windings 106 and 108 of the first driver transformer 100 are identical to the connections between the output switch means 142 and 146 and the secondary windings 112 and 114 of the second driver transformer 102, the following description will depict the connection and operation of the output switch means 140 and 142 and the first driver transformer 100; it being understood that similar connections exist for the remaining output switch means and the second driver transformer 102. Accordingly, the base of output transistor is connected to the first end 132 of the first secondary winding 106 of driver transformer 100. The collector of output transistor 140 is connected to the positive voltage supply conductor 116 and the emitter is connected to the second end 134 of the secondary winding 106 of the driver transformer 100. Similarly, the base of the second output transistor 144 is connected to the second end 136 of the secondary winding 108 of the first driver transformer 100 with the emitter of transistor 144 connected to the first end 138 of the secondary winding 108 and the collector connected to the negative voltage supply conductor 118.

In operation, when driver transistor 120 is gated to the conductive state by pulses on conductor 52 from the pulse width modulation circuitry 30, shown in FIGS. 1 and 2, the primary winding 104 of the first driver transformer 100 will be connected between the positive supply voltage and ground, thereby causing energizing current to flow in the primary which induces a current in the secondary windings 106 and 108 of the driver transformer 100. The secondary current supplies base current to output transistors 140 and 144, thereby triggering the output transistors 140 and 144 into conduction and allowing energizing current to flow into the output transformer means, as described in detail hereafter. When the driver transistor 120 is gated to the non-conductive or off state, the primary and secondary magnetic fields of the driver transformer 100 will collapse.

As is well known, transistors have associated therewith a stored base charge when the transistors are turned off from the conductive or on state. This stored base charge hinders or slows down the turn-off time of such transistors. According to a novel aspect of this invention, the stored base charge on the output transistors is removed, thereby decreasing the turnoff time of the transistors, by adding a capacitor in parallel with the primary winding of the driver transformer, such as capacitor 148 for primary winding 104 and capacitor 150 for primary winding 110. When the driver transistor 120 is turned ON, capacitor 148 is immediately charged and the magnetizing current starts to flow in the primary winding of the driver transformer 100; thereby building up flux. When the driver transistor is turned OFF, i.e., the transistor current has reached zero, a reversal of the polarity of the primary and secondary windings of the driver transformer 100 occurs. The current path for the decay of the flux stored in the driver transformer 100 is through the capacitor 148 in the primary and the base-emitter junction of the output transistors 140 and 144 in the secondary. Since the capacitor effectively short circuits the primary, little dissipation takes place in the primary circuit. The principal path for decay of the magnetization flux is in the secondary circuit where the power dissipation occurs as a result of the immediate reversal of the winding voltage and the current flow due to the removal of the stored base charge from the output transistors. Thus, the energy stored in the driver transformer utilized to remove the stored base charge from the output transistors which thereby decreases the turnoff time of the output transistors and produces a more efficient voltage regulator.

In the prior art, it is known to utilize a resistor and capacitor series circuit in parallel with the primary winding of the driver transformer; however, such an RC network is intended for an entirely different purpose, namely, damping, and does nothing to reduce the stored base charge of the output transistors. In the present invention, no series resistor is required since the capacitor effectively removes the stored base charge of the output transistors at a greater rate than in the prior art devices. Other attempts to remove the stored base charge of the output transistors have also been made and include various diode and tapped winding arrangements which prevent the output transistors from being driven hard into saturation. However, such an arrangement reduces the efficiency of the regulator since power is wasted by not driving the output transistors hard into saturation.

The output stage 20 of the voltage regulator 10 also includes an output transformer 160 having first and second primary windings 162 and 164, respectively, and a plurality of secondary windings 186, 188, 190 and 192 inductively coupled with a magnetic core. The primary windings 162 and 164 are wound in a first polarity direction and have one end connected together to form a common junction, indicated by reference number 166. The first end of the first primary winding 162 is connected to junction 168 formed by the connection of the emitters of output transistors 140 and 146. The other end of the second primary winding 164 is connected to junction 170 formed by the connection of the emitters of output transistors 142 and 144. Thus, when the output transistors 140 and 144 are gated to the conductive state, as described above, the primary windings 162 and 164 of the output transformer 160 are connected between the positive and negative voltage supply conductors 116 and 118, respectively, thereby causing energizing current to flow in a first direction, indicated by arrow 172, through the primary windings 162 and 164 of the output transformer 160. Similarly, when output transistors 142 and 146 are gated into the conductive state by driver transistor 122, the primary windings 162 and 164 will be connected between the positive and negative voltage supply conductors 116 and 118, respectively, in a reverse polarity direction, opposite that indicated by arrow 172, so as to cause energizing current to flow therethrough in an opposite direction. Clamp diodes 174 and 176 are connected between junction 168 and the positive and negative voltage supply conductors 116 and 118; while clamp diodes 178 and 180 are connected between junction 170 and the positive and negative voltage supply conductors 116 and 118, respectively, so as to protect the output transistors from reverse transient voltages when the output transistors are turned off.

Since it is known that transistors possess unequal switching characteristics, the triggering of the output transistors into the conductive state in pairs causes transient voltages to be produced which generate noise and affects the reliable operation of the voltage regulator 10 and the utilization devices 14. In order to substantially reduce the noise generated by the differences in the switching times of the output transistor pairs, the primary and secondary windings of the output transformer 160 are each wound in a bifiliar configuration, i.e., each winding is wound two turns at a time around the magnetic core. Further, the primary and secondary windings are wound at the same time in a quadfiliar fashion such that adjoining groups of turns of the primary windings are separated by groups of two turns of the secondary windings. This arrangement substantially increases inductive coupling between the primary and secondary windings which reduces leakage inductance; thereby improving the efficiency of the output transformer by minimizing transient noise generation.

According to another novel aspect of this invention, first and second capacitance means 182 and 184, respectively, as respectively connected between the common junction 166 of the primary windings 162 and 164 of the output transformer 160 and the positive and negative voltage supply conductors 116 and 118. This arrangement creates a virtual ground at the common junction 166 between first and second primary output windings 162 and 164. The capacitors 182 and 184 supply sufficient electrical energy so as to maintain current flow into the junction 166 equal to the current flowing out of the junction 166. This arrangement was found to equalize the transient switching voltages caused by the differences in the switching times of the output transistor pairs, thereby significantly reducing the noise generated in the switching regulator 10.

The flow of energizing current through the primary windings 162 and 164 of the output transformer 160 induces a current in secondary windings 186, 188, 190 and 192. As shown in FIG. 3, secondary windings 186 and 188 are wound in an opposite polarity direction from secondary windings 190 and 192. One end of each secondary winding is connected together; with the other end of each secondary winding being connected to the anode of diode means 194, 196, 198 and 200, respectively. The cathodes of each diode means 194, 196, 198 and 200 are connected together to form two parallel, full-wave, center-tapped rectifiers that rectify the output voltage of the output transformer 160. According to the preferred embodiment of this invention, each diode means 194, 196, 198 and 200 are formed of Schottky diodes which possess low forward voltage drop at high currents in conjunction with relatively low 125° C. maximum junction operating temperatures. In order to keep the junction temperature of the Schottky diodes within limits despite the high current in the present application, four secondary windings 186, 188, 190 and 192 are utilized. It will be understood that other applications involving lower currents than that of the present application would not necessarily require four secondary output windings.

Figure 5:
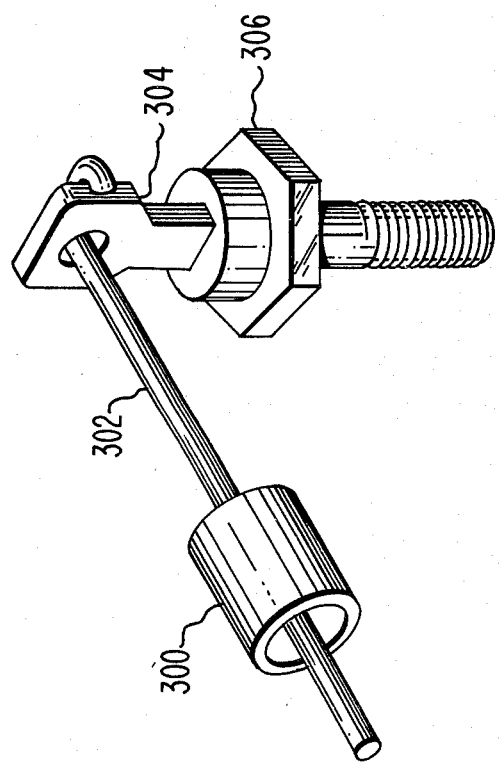
FIG. 5 is a perspective view of the reverse overvoltage protection means for the Schottky diodes utilized in this invention.

It is known that Schottky diodes have a failure mode when a high reverse voltage exceeding the maximum rise time limit of the Schottky diode is applied thereto. The maximum rate of change (dv/dt) limit, typically 700 volts/microsecond, may be exceeded when current flow through the output transformer secondary winding reverses polarity direction. It is normal practice to protect Schottky diodes from transient reverse voltages by means of a series resistor-capacitor snubber circuit connected in shunt with each Schottky diode. Although such a circuit effectively protects the Schottky diode from damaging transient reverse overvoltages, it uses a large amount of electrical energy which decreases the efficiency of the apparatus it is utilized in. It is proposed, instead, to utilize a small inductance in series with each Schottky diode in order to limit the rate of change of the reverse voltage across the diode. More preferably, the series inductance is provided in the form of hollow sleeve or shielding bead of magnetic material, such as ferrite or powdered iron, which is placed in inductive relation around the conductor connecting the anode of the Schottky diode and the secondary output winding, as shown more clearly in FIG. 5. FIG. 5 illustrates in perspective form the use of a hollow sleeve 300 of magnetic material which is disposed in a single turn relationship around the conductor 302 connecting the anode 304 of the Schottky diode 306 to an electrical circuit. Referring again to FIG. 3, similar sleeves of magnetic material are disposed between the anodes of each Schottky diode 194, 196, 198 and 200 and one end of the secondary windings 186, 188, 190 and 192, respectively, of the output transformer 160, as generally indicated by inductance symbols 202, 204, 206 and 208.

The type of material as well as the length and cross sectional dimensions of the hollow sleeve are chosen to provide a suitable high impedance at the harmonics of the 20 kHz switching frequency sufficient to adequately protect the Schottky diode from damaging reverse overvoltages. Since the use of hollow magnetic sleeves is well known, the calculations necessary to determine the particular length and cross sectional dimensions of each sleeve, required to provide a predetermined magnitude of inductance, will not be described in detail. It has been found that the use of a hollow sleeve of magnetic material disposed around the conductor connected to the anode of a Schottky diode provides a small inductance that effectively protects the Schottky diode from reverse overvoltages in the same manner as the prior art series resistor-capacitor circuit in shunt with the diode and, at the same time, utilizes fewer components and is significantly more energy efficient.

Referring again to FIG. 3, the cathodes of the diode means 194, 196, 198 and 200 are connected to a filter choke network, generally indicated by reference numbers 210, 211A, 211B and 213. According to the preferred embodiment of this invention, filters 210, 211A and 211B are formed by a magnetic core having a plurality of windings disposed in inductive relation therewith. Each filter choke 210 is formed of nine winding turns, with each filter choke 211A and 211B consisting of a single winding turn about the magnetic core. The filter choke network eliminates the ripple from the output voltage of the output transformer 160, thereby providing on conductor 212 a regulated D.C. output voltage of the desired magnitude, such as +5 volts. A zener diode 214 is provided between conductor 212 and ground in order to protect the voltage regulator 10 from being inadvertently connected to supply voltages that exceed its maximum rating.

Figure 4:
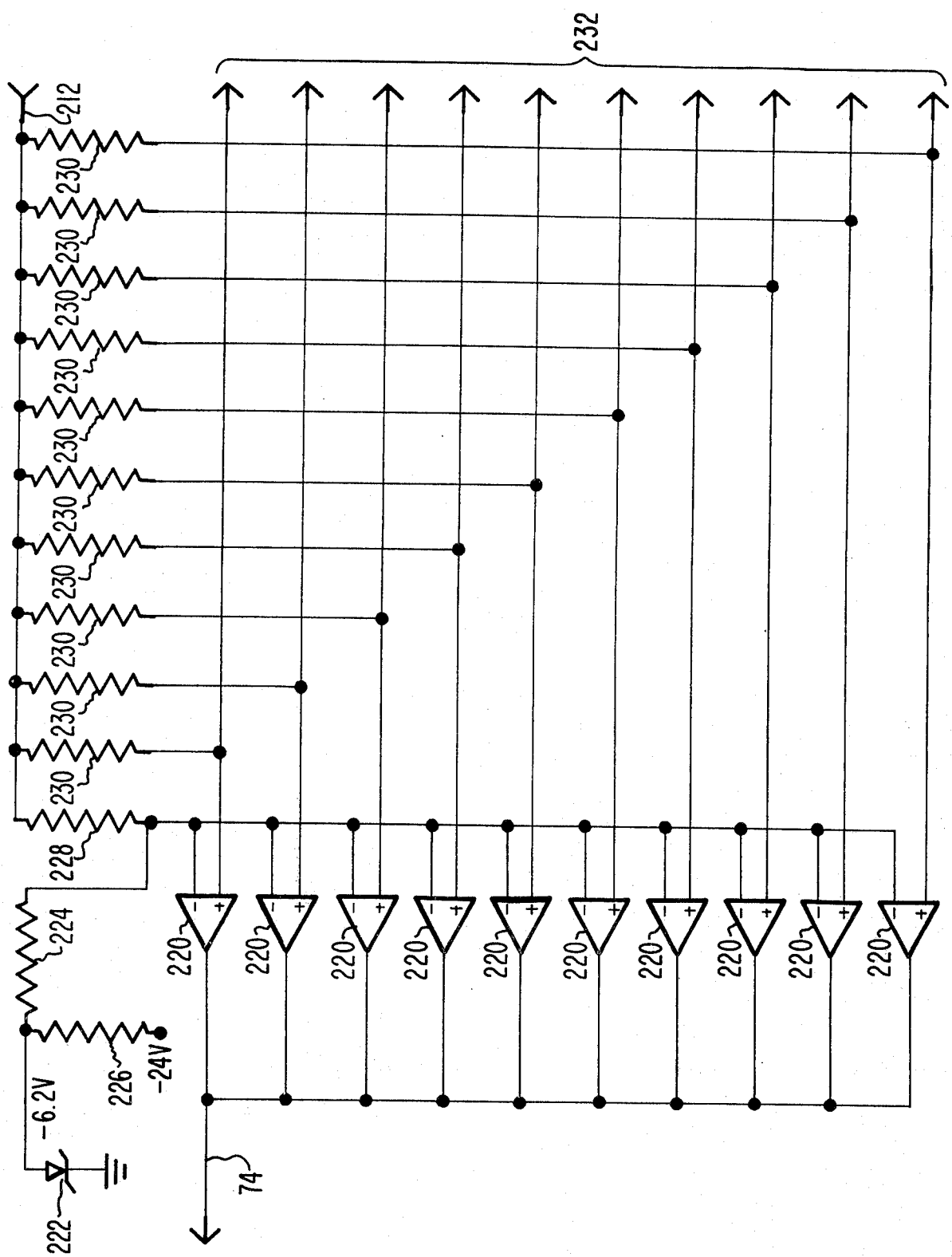
FIG. 4 is a detailed schematic diagram of the overcurrent sense circuitry shown in FIG. 1.

Referring now to FIG. 4, there is shown a detailed schematic diagram of the overcurrent sense circuitry 24. The overcurrent sense circuitry includes a plurality of comparators, generally indicated by reference numeral 220, each having on and off output states. The inverting (−) input of each comparator 220 is connected to a reference voltage circuit consisting of zener diode 222 and a resistor divider network formed by resistors 224 and 226 and also to the output voltage from the filter 22, FIG. 3, carried on conductor 212 through resistor 228. Due to high current requirements of the present application, ten comparators 220 are utilized with ten outputs to divide the output current. It will be understood that different applications involving lower current requirements may use fewer comparators for overcurrent sensing. The non-inverting (+) input of each comparator 220 is connected through a resistor 230 to the conductor 212 carrying the output voltage from the filter section 22 of the voltage regulator 10. According to the preferred embodiment of this invention, resistors 230 have approximately 1 milliohm of resistance. Thus, the inverting (−) input of each comparator 220 has an input signal thereon which is 6.2 millivolts less than the output voltage carried on conductor 212. In operation, an overcurrent condition on one of the outputs 232 connecting the voltage regulator 10 to the utilization devices 14 will cause a voltage drop greater than 6.2 millivolts through the appropriate resistor 230, thereby causing the output of the appropriate comparator 220 to go to ground.

Referring again to FIG. 2, the use of the overcurrent sensing circuitry to alter the output of the voltage regulator 10 will now be described in conjunction with the pulse width modulator circuitry 30. When an overcurrent condition is sensed, as indicated by a ground on the output of one of the comparators 220, shown in FIG. 4, conductor 74 will go to ground potential thereby forward biasing diode 76 and causing the voltage at the junction 68 at the output of the error amplifier 62, which has a high, several megaohms, output impedance, to be lowered towards ground. The resistor 70-capacitor 72 series network acts as an integrator in averaging the changing magnitude of the voltage appearing at junction 68. This analog signal is feedback through appropriate feedback means, such as resistor 66, to the inverting (−) input of amplifier 62 in order to modify the gain of the amplifier 62. In this manner the input voltage to the amplifier 62 is lowered which, in turn, causes the magnitude of the output voltage to be further decreased in a linear fashion. This linear reduction in the output of the amplifier 62 causes the output voltage and current of the voltage regulator 10, through the driver and output circuitry described above, to be linearly reduced until the overcurrent condition is eliminated.

Table I, shown below, illustrates representative component values used in a typical embodiment of the present invention as described with reference to FIGS. 2, 3 and 4. These values are representative only and in no way constitute any limitation upon the present invention.

TABLE I

| Component | Reference No. | Value or Designation |
|---|---|---|
| Regulating Pulse Width Modulator | 30 | Silicon General Inc., Model No. SG1524 |
| Transistors | 80 | 2N4208 |
| Transistors | 82 | 2N930 |
| Transistors | 120,122 | 2N4895 |
| Transistors | 140,142 | 2N3715 |
| Transistors | 144,146 | 2N3792 |
| Comparators | 84,86,220 | LM339 |
| Diode | 76 | 1N4154 |
| Schottky diodes | 194,196,198,200 | SD51 Schottky |
| Zener diode | 214 | 5V TRANSORB |
| Zener diode | 222 | 6.2V Zener |
| Diodes | 174,176,178,180 | 1N4001 |
| Transformer | 160 | Magnetics Inc., Model No. ZF-43813-TC; 11:4 turns ratio |
| Transformers | 100,102 | Magnetics Inc., Model No. EP17, 120:11 turns ratio |
| Inductors | 202,204,206,208 | Stackpoole Carbon, #57-0049 shielding bead, 0.95–1.75 microhenries |
| Inductors | 210 | Core-Magnetics Inc., Model No. 55924, #210- 9 turns each trifiliar |
| Inductors | 211 | #211 - 1 turn each octafiliar |
| Capacitors | 35,72 | 0.1 microfarads |
| Capacitors | 38,61,148,150 | 0.01 microfarads |
| Capacitors | 81 | 100 picofarads |
| Capacitors | 147,149 | 6.8 microfarads |
| Capacitors | 182,184 | 4 microfarads |
| Capacitors | 213,215 | 2200 microfarads |
| Resistors | 52,75,79,89,224 | 10K ohms |
| Resistors | 83 | 15.8K ohms |
| Resistors | 85 | 1050 ohms |
| Resistors | 87 | 4990 ohms |
| Resistors | 49,49A,76,226 | 1000 ohms |
| Resistors | 63,65,69 | 5050 ohms |
| Resistors | 67 | 1680 ohms |

TABLE I-continued

| Component | Reference No. | Value or Designation |
|---|---|---|
| Resistors | 66 | 100K ohms |
| Resistors | 70 | 4700 ohms |
| Resistors | 78 | 2870 ohms |
| Resistors | 121,123 | 100 ohms |
| Resistors | 125,127 | 82 ohms |
| Resistors | 228 | 21.5 ohms |
| Resistors | 230 | 1 milliohms. |

In summary, there has been disclosed herein a new and improved voltage regulator which provides a precisely regulated D.C. voltage at its output. The voltage regulator includes a driver transistor switch which periodically supplies energizing current to the primary of a driver transformer. The primary current induces current in the secondary windings of the driver transformer which triggers output transistor switches connected thereto into conduction so as to supply energizing current to the primary windings of an output transformer. A capacitor is connected in parallel with the primary winding of the driver transformer to provide a low dissipation path when the reversal of the polarity of the primary and secondary windings of the driver transformer occurs due to the driver transistor switch current dropping to zero so as to reduce the stored base charge on the output transistor switch means thereby decreasing the turnoff time of the output transistor and improving the efficiency of the voltage regulator.

The primary windings of the output transformer are connected together to form a common junction. Capacitors are connected between the common junction of the primary windings and the positive and negative voltage supply conductors to form a virtual ground at the common junction which cancels input current switching transients and reduces noise generation. The outputs of the secondary windings of the output transformer are connected to Schottky diodes arranged in a full-wave, center-tapped rectifier configuration. Hollow sleeves of magnetic material are disposed around the conductor conducting the secondary windings to the anode of the Schottky diode and provide a small inductance in series with the Schottky diode that protects the Schottky diode from transient reverse overvoltages exceeding the maximum limits of the diode. Overcurrent sensing means are provided wherein comparators generate an error signal when an overcurrent condition exists at the output of the voltage regulator. The error signal is fed back to the switching regulator controller which linearly decreases the output voltage of the voltage regulator through the driver and output circuits until the overcurrent condition is removed.

What is claimed is:

1. A voltage regulator for receiving an unregulated input voltage from an electrical energy source and supplying a regulated D.C. voltage at its output, said voltage regulator comprising:
    a first transformer means including a magnetic core having first and second electrical windings disposed in inductive relation therewith;
    driver switch means, operably connected to said first electrical winding and having on and off states for, when on, supplying energizing current from said electrical energy source to said first transformer means;
    regulating means, operably connected to said driver switch means and reponsive to the magnitude of said output voltage of said voltage regulator, for controlling the length of time said driver switch means is in the on state so as to control the amount of energizing current applied to said first transformer means;
    second transformer means for providing an output voltage of a predetermined magnitude;
    output switch means, having on and off states and operably connected to said second electrical winding of said first transformer means and to second transformer means, for, when switched to said on state by said first transformer means, supplying energizing current to said second transformer means; and
    capacitance means, coupled in parallel with said first electrical winding of said first transformer means, for short-circuiting said first electrical winding when said driver switch means is switched to said off state so as to decrease the turnoff time of said output switch means.

2. The voltage regulator of claim 1 wherein each of the driver and output switch means includes a transistor.

3. The voltage regulator of claim 1 wherein the second transformer means include a magnetic core having at least first and second electrical windings disposed in inductive relation thereon, said first electrical winding of said second transformer means being connected to the output switch means.

4. The voltage regulator of claim 3 wherein the first and second electrical windings of the second transformer means are each disposed in bifiliar wound configuration about the magnetic core of the second transformer means.

5. The voltage regulator of claim 1 further including filter means operably connected to the second transformer means for providing a D.C. voltage at the output of said voltage regulator.

6. A voltage regulator for receiving an unregulated input voltage from an electrical energy source and supplying a regulated D.C. voltage at its output, said voltage regulator comprising:
    first transformer means including a magnetic core having first and second electrical windings disposed in inductive relation thereon;
    driver switch means, operably connected to said first electrical winding and having on and off states, for, when in said on state, supplying energizing current from said source to said first transformer means;
    regulating means, operably connected to said driver switch means and responsive to the magnitude of said output voltage of said voltage regulator, for controlling the length of time said driver switch means is in said on state so as to control the amount of energizing current supplied to said first transformer means;
    second transformer means for providing an output voltage of a predetermined magnitude, said second transformer means including a magnetic core having first and second primary electrical windings and at least one secondary electrical winding disposed in inductive relation thereon, said first and second primary electrical windings each having first and second ends, with one end of each of said first and second primary electrical windings being connected together to form a common junction;
    output switch means, having on and off states and operably connected to said second electrical winding of said first transformer means and to said first and second primary electrical windings of said second transformer means for, when in said on state, supplying energizing current to said second transformer means; and first and second capacitance means connected between said common junction and said source of electrical energy so as to maintain said common junction substantially at ground potential.

7. The voltage regulator of claim 6 wherein the output switch means includes first, second, third and fourth transistors, with said first and second transistors being connected between the ends of said first and second primary electrical windings of the second transformer means and the electrical energy supply so as to cause energizing current to flow through said first and second primary electrical windings in a first polarity direction, said third and fourth transistors being connected between the ends of said first and second primary electrical windings of the second transformer means and said electrical energy supply so as to cause energizing current to flow through said first and second primary windings in a second polarity direction.

8. The voltage regulator of claim 6 wherein the second transformer means includes a plurality of secondary windings each having one end thereof connected together, and further including diode means connected to the other ends of each of said secondary electrical windings, said diodes being connected together in a full-wave, center-tapped configuration that provides a D.C. voltage of a predetermined magnitude.

9. The voltage regulator of claim 8 wherein the diode means includes Schottky diodes and further including a hollow sleeve of magnetic material disposed in inductive relation around the conductor connecting said diode and the secondary electrical winding of the second transformer means, said hollow sleeve providing a predetermined magnitude of inductance sufficient to protect said Schottky diode from transient reverse overvoltages.

10. A voltage regulator for receiving an unregulated input voltage from an electrical energy source and supplying a regulated D.C. voltage at its output, said voltage regulator comprising:

first and second driver transformer means, each having primary electrical windings and first and second secondary electrical windings disposed in inductive relation with a magnetic core;

first and second driver switch means, operably connected to said primary electrical windings of said first and second driver transformer means, respectively, and having on and off states, for, when in said on state, supplying energizing current from said electrical energy source to said first and second driver transformer means;

regulating means, operably connected to said first and second driver switch means and responsive to the magnitude of said output voltage of said voltage regulator, for controlling the length of time said first and second driver switch means are in said on state so as to control the amount of energizing current supplied to said first and second driver transformer means, said regulating means alternately triggering said first and second driver switch means into said on state;

output transformer means for providing an output voltage of a predetermined magnitude, said output transformer means having first and second primary electrical windings and first, second, third and fourth secondary electrical windings disposed in inductive relation with a magnetic core, said first and second primary electrical windings each having first and second ends, with one end of each being connected together to form a common junction;

third, fourth, fifth and sixth output switch means having on and off states, the state of said third and fourth output switch means being respectively controlled by said first and second secondary electrical windings of said first driver transformer means, the state of said fifth and sixth output switch means being respectively controlled by said first and second secondary electrical windings of said second driver transformer means;

said third and fourth output switch means, when in said on state, connecting said first and second primary electrical windings of said output transformer means in a first polarity direction to said electrical energy source;

said fifth and sixth output switch means when in said on state, connecting said first and second primary electrical windings of said output transformer means in a second polarity direction to said electrical energy source;

first and second capacitance means respectively connected in parallel with said primary electrical windings of said first and second driver transformer means for short-circuiting said primary windings of said first and second driver transformer means when said first and second driver switch means are switched to said off state so as to decrease the turnoff time of said third, fourth, fifth and sixth output switch means;

third and fourth capacitance means connected between said common junction of said first and second primary electrical windings of said output transformer means and said voltage source to form a virtual ground at said common junction;

one end of each of said first, second, third and fourth secondary electrical windings of said output transformer means being connected together;

first, second, third and fourth Schottky diodes respectively connected to the other end of each of said first, second, third and fourth secondary electrical windings to form a full-wave, center-tapped rectifier configuration; and first, second, third and fourth hollow sleeves, each formed of ferrite material, said first, second, third and fourth hollow sleeves disposed in inductive relation around the conductors connecting said first, second, third and fourth secondary electrical windings and said first, second, third and fourth Schottky diodes to provide an inductance of a predetermined magnitude that is sufficient to protect said Schottky diodes from reverse overvoltages.

11. An electrical circuit for supplying electrical energy from a source to a load, said electrical circuit comprising:

a Schottky diode for rectifying said electrical energy in said circuit; conductor means for connecting said Schottky diode to said electrical circuit; and a hollow sleeve of magnetic material disposed in inductive relation around said conductor means and providing an inductance of a predetermined magnitude that is sufficient to protect said Schottky diode from reverse overvoltages.

12. The electrical circuit of claim 11 wherein the magnetic material forming the hollow sleeve is ferrite.

* * * * *

UNITED STATES PATENT AND TRADEMARK OFFICE
CERTIFICATE OF CORRECTION

PATENT NO. : 4,213,082
DATED : JULY 15, 1980
INVENTOR(S) : DANIEL A. WISNER ET AL.

It is certified that error appears in the above—identified patent and that said Letters Patent is hereby corrected as shown below:

Column 1, line 8, "filed 10/27/79" should read

-- filed 10/27/78 --.

Column 2, line 67, "transformer magnetic current" should read

-- transformer magnetic circuit --.

Signed and Sealed this

Twenty-eighth Day of October 1980

[SEAL]

Attest:

SIDNEY A. DIAMOND

Attesting Officer

Commissioner of Patents and Trademarks